3,432,292
METHOD OF PREPARING CHROMIUM-LITHIUM ALLOYS
Donald W. White, Burnt Hills, N.Y., assignor to General Electric Company, a corporation of New York
No Drawing. Filed Oct. 31, 1966, Ser. No. 590,552
U.S. Cl. 75—135
Int. Cl. C22c 1/04, 3/00, 27/00
3 Claims

ABSTRACT OF THE DISCLOSURE

A method for alloying chromium with lithium to improve the oxidation resistance of the chromium metal in which chromium metal is placed in contact with lithium-hydride and the combination then heated to a temperature at least high enough to dissociate the lithium hydride into elemental lithium and nascent hydrogen and continuing the heating to diffuse the lithium into the chromium.

---

It has previously been found that although chromium generally forms a tight and impervous oxide layer that protects the metal against further and potentially catastrophic oxidation, the oxidation resistance can be further improved by alloying the chromium with minor amounts of lithium, for example generally no more than 5 percent. The beneficial effect of lithium additions on the oxidation resistance of chromium is further explained in "Factors Controlling the High Temperature Oxidation of Chromium," W. C. Hagel, Trans. A.S.M., 1963, vol. 56, p. 583. While it is known to be desirable to add lithium to chromium, the mechanics of making such additions has presented some serious problems. Broadly speaking, it has not been possible to effectively alloy elemental chromium and elemental lithium by direct melting procedures. Diffusion of lithium into chromium by a vapor phase reaction has been tried and is partially effective but still is deficient as a metallurgically effective way of placing lithium into chromium.

It is a principal object of this invention to provide an improved method of alloying minor amounts of lithium with chromium.

Other objects and advantages of this invention will be in part obvious and in part explained by reference to the accompanying specification.

It was earlier indicated that the present invention is directly concerned with the alloying of minor amounts of lithium into chromium material and more specifically that this process involved the contacting of chromium with lithium hydride, the combination then being heated to some temperature at least as high as the dissociation temperature of the hydride so that elemental lithium and nascent hydrogen would be formed. The present process is particularly applicable with respect to powders since it provides an extremely effective method of uniformly contacting the individual particles to obtain compositional and structural homogeneity. Because the method is advantageous, particularly in connection with powders, the remainder of the discussion will describe the use of the method in connection with powders. But, it should be recognized that it is not intended that the invention be limited solely to powders.

Considering some specific examples of the method of this invention powder compacts were produced by combining 90 mol percent chromium powder with 10 mol percent lithium hydride powder, thoroughly mixing the two powders together so that chromium metal was in contact with lithium hydride powder, and then pressing the mixture into the shape of pellets. The pellets were then heated at different temperatures in a flowing hydrogen atmosphere. Samples were heated five hours at 600° C. while other samples were heated for five hours at 800° C. At these temperatures lithium hydride, which melts at about 689° C., dissociated or decomposed into lithium metal and nascent hydrogen. As long as the temperature used is above the hydride dissociation temperature there is nothing critical about the particular temperature selected. It will be recognized, however, that greater diffusion of lithium can be obtained in lesser periods of time if higher rather than lower temperatures are selected.

The presence of the nascent hydrogen is an important feature of this invention since it is felt to react with the surfaces of the chromium, rendering them clean and more susceptible to lithium diffusion than would otherwise be the case.

After the heat treatment the samples were crushed and thoroughly washed in hot water until the wash water became neutral in pH. They were then analyzed for lithium spectrographically, and it was found that those heat treated for five hours at 600° C. had picked up 0.0375 atom percent lithium whereas those heat treated for five hours at 800° C. had acquired 0.135 atom percent lithium.

Additional compacts were made by combining 80 mol percent chromium powder with 20 mol percent lithium hydride powder, pressing the mixture to form green bodies and heating the green bodies in flowing hydrogen for four hours at 1,000° C. These bodies were crushed and washed in the same manner outlined earlier in connection with other samples and then chemically analyzed. They were found to have acquired 1.5 atom percent lithium.

By virtue of using dissociable compounds of lithium which provides material rendering the chromium more susceptible to the infusion of lithium, the present method has advanced beyond previously existing processes for preparing lithium-chromium alloys.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An improved method for alloying chromium with lithium comprising:
   placing chromium metal in contact with lithium hydride,
   heating the chromium and lithium hydride to a temperature at least high enough to dissociate the lithium hydride,
   dissociating the lithium hydride to form lithium metal with nascent hydrogen, and
   continuing the heating for a time sufficient to diffuse a predetermined amount of lithium into the chromium.
2. A method as described in claim 1 wherein the chromium and lithium hydride are heated to at least about 600° C.
3. A method as described in claim 1 wherein the chromium and lithium hydride are in particulate form and are mixed and compacted prior to heating.

References Cited
UNITED STATES PATENTS
2,545,821   3/1951   Lindsley et al. _____ 75—176

RICHARD O. DEAN, *Primary Examiner.*

U.S. Cl. X.R.
75—176, .5